United States Patent
Van Wiemeersch et al.

(10) Patent No.: US 12,169,754 B2
(45) Date of Patent: Dec. 17, 2024

(54) SYSTEMS AND METHODS FOR TRACKING A TOOL STORED IN AN ENCLOSURE

(71) Applicant: Ford Global Technologies, LLC, Dearborn, MI (US)

(72) Inventors: John Robert Van Wiemeersch, Novi, MI (US); Jake Schwartz, Dearborn, MI (US); Aaron Matthew DeLong, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 18/148,948

(22) Filed: Dec. 30, 2022

(65) Prior Publication Data

US 2024/0220749 A1 Jul. 4, 2024

(51) Int. Cl.
*G06K 7/10* (2006.01)
*B60H 1/00* (2006.01)

(52) U.S. Cl.
CPC ..... *G06K 7/10405* (2013.01); *B60H 1/00742* (2013.01); *G06K 7/10128* (2013.01); *G06K 7/10465* (2013.01)

(58) Field of Classification Search
None
See application file for complete search history.

(56) References Cited

U.S. PATENT DOCUMENTS

| | | | | |
|---|---|---|---|---|
| 4,682,010 A | * | 7/1987 | Drapeau | A61M 16/16 138/128 |
| 7,097,226 B2 | | 8/2006 | Bingle et al. | |
| 7,548,197 B2 | * | 6/2009 | Gruchala | G01S 19/14 342/357.52 |
| 9,198,215 B2 | * | 11/2015 | Gantman | H04W 48/20 |
| 9,239,949 B2 | * | 1/2016 | Jung | G06V 40/174 |
| RE46,108 E | * | 8/2016 | Ohnishi | G08C 17/00 |
| 9,647,886 B2 | * | 5/2017 | Drake | H04L 41/0816 |
| 9,953,285 B2 | * | 4/2018 | Herberg | G06Q 50/06 |

(Continued)

OTHER PUBLICATIONS

Thomas Price, Machine Learning to Identify Vehicle Maintenance Needs, Dec. 7, 2017, 1-42.

(Continued)

*Primary Examiner* — Carlos Garcia
(74) *Attorney, Agent, or Firm* — Frank Lollo; Eversheds Sutherland (US) LLP

(57) ABSTRACT

This disclosure is generally directed to systems and methods related to tool tracking. In an example embodiment, a method may involve detecting, by a tool monitoring device, a failure of a wireless communication system included in a tool that is stored in an enclosure. The tool monitoring device may determine that the failure is attributable to a temperature in the enclosure being outside an operating temperature range of the wireless communication system. A notification of the failure and/or a description of a cause for the failure may be displayed on a display screen of the tool monitoring device and/or transmitted to a tool tracking device. In an example implementation, the tool tracking device is located outside a vehicle, the enclosure is a toolbox (Continued)

placed in the vehicle, and the tool monitoring device, which is configured to monitor an operational status of the wireless communication system, is located in the vehicle.

7 Claims, 5 Drawing Sheets

(56) References Cited

U.S. PATENT DOCUMENTS

| | | | |
|---|---|---|---|
| 10,710,430 B2* | 7/2020 | Bryant | B60H 1/3202 |
| 10,742,778 B2* | 8/2020 | Huo | H04L 12/282 |
| 10,983,893 B1* | 4/2021 | Riedlinger | G06F 11/0751 |
| 11,014,431 B2 | 5/2021 | Shrivastava et al. | |
| 11,088,404 B2* | 8/2021 | Koujiya | H01M 10/425 |
| 2003/0100962 A1* | 5/2003 | Sumita | H04L 9/40 |
| | | | 700/48 |
| 2007/0155418 A1* | 7/2007 | Shau | H04M 1/66 |
| | | | 455/550.1 |
| 2009/0112506 A1* | 4/2009 | Kazama | G01K 7/42 |
| | | | 702/130 |
| 2009/0138154 A1* | 5/2009 | McLain | F02D 41/187 |
| | | | 701/29.2 |
| 2009/0243815 A1* | 10/2009 | Tolli | G08C 15/00 |
| | | | 340/12.37 |
| 2012/0019674 A1* | 1/2012 | Ohnishi | G08C 17/00 |
| | | | 348/207.1 |
| 2014/0247711 A1* | 9/2014 | Gantman | H04W 88/08 |
| | | | 370/254 |
| 2015/0236928 A1* | 8/2015 | Drake | H04L 43/0829 |
| | | | 709/224 |
| 2015/0307332 A1 | 10/2015 | Huang | |
| 2016/0013629 A1* | 1/2016 | Nagatomo | H02H 5/04 |
| | | | 361/93.8 |
| 2016/0216700 A1* | 7/2016 | Fan | G05B 15/02 |
| 2018/0208221 A1 | 7/2018 | Singh | |
| 2018/0218594 A1* | 8/2018 | Chang | G08C 17/02 |
| 2019/0075190 A1* | 3/2019 | Huo | H04L 69/24 |
| 2019/0238355 A1* | 8/2019 | Marcinkowski | G08B 13/08 |
| 2019/0319317 A1* | 10/2019 | Koujiya | H01R 13/6683 |
| 2020/0222261 A1* | 7/2020 | Ito | G06K 19/0728 |
| 2021/0364227 A1* | 11/2021 | Kim | G05B 19/042 |

OTHER PUBLICATIONS

Laura Flowers, 5 Tips for Power Tool Maintenance Management, Sep. 22, 2020, 108.

* cited by examiner

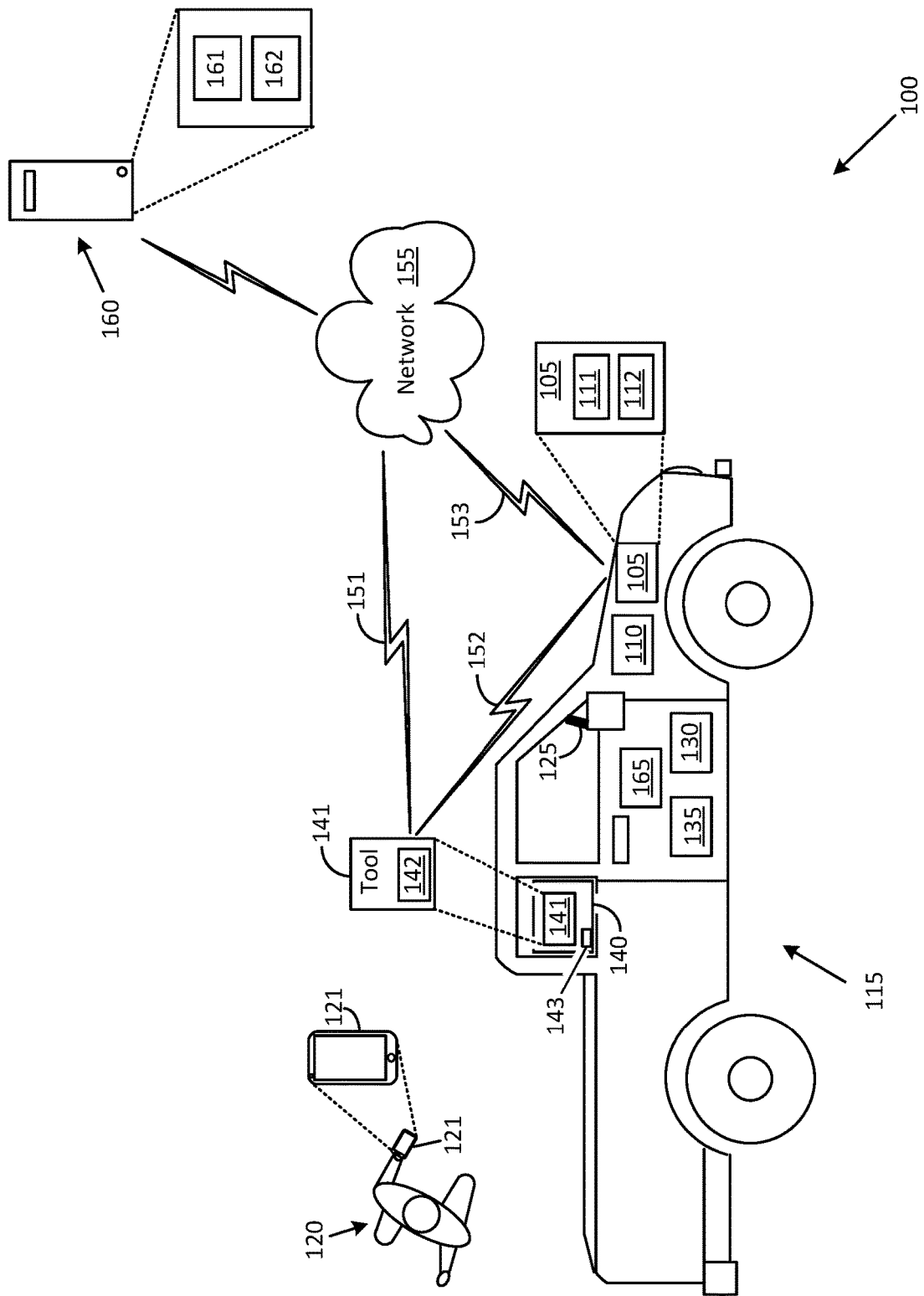

SYSTEMS AND METHODS FOR TRACKING A TOOL STORED IN AN ENCLOSURE

BACKGROUND

It is often desirable to keep track of an object such as, for example, a package, a set of keys, or a wallet. One way to do so is to attach a radio tag to the object. However, in some cases, the radio tag may fail or malfunction thereby preventing tracking of the object. It is therefore desirable to provide a way to identify such a malfunction or failure and to identify a cause of the malfunction or failure.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 illustrates an example tool monitoring system in accordance with an embodiment of the disclosure.

DETAILED DESCRIPTION

Overview

Figure 2A:
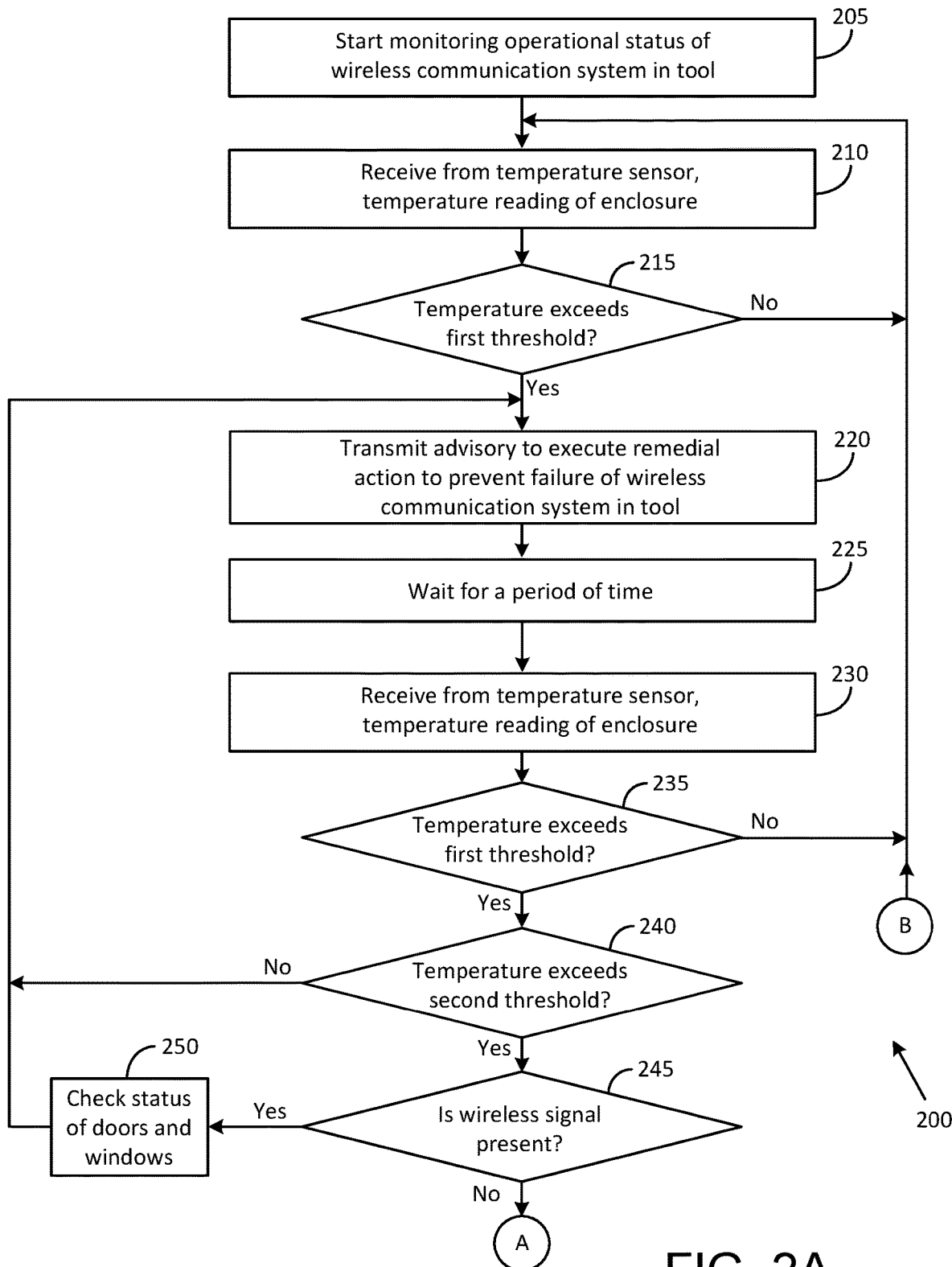
FIGS. 2A and 2B illustrate a flowchart of a method to provide tool monitoring in accordance with an embodiment of the disclosure.

In terms of a general overview, certain embodiments described in this disclosure are directed to systems and methods related to tool tracking. In an example embodiment, a method may involve detecting, by a tool monitoring device, a failure of a wireless communication system included in a tool that is stored in an enclosure. The tool monitoring device may determine that the failure is attributable to a temperature in the enclosure being outside an operating temperature range of the wireless communication system. A notification of the failure, and/or a description of a cause for the failure, may be displayed on a display screen of the tool monitoring device and/or transmitted to a tool tracking device. In an example implementation, the enclosure is a toolbox placed in a vehicle, the tool monitoring device is located in the vehicle, and the tool tracking device is located outside the vehicle. The tool monitoring device is configured to monitor an operational status of the wireless communication system and to report to the tool tracking device a failure of the wireless communication system. The failure of the wireless communication system in the tool may be detected in various ways such as, for example, by detecting a loss of a wireless signal transmitted by the wireless communication system, or by detecting a lack of a response from the wireless communication system to a tool polling procedure executed by the tool monitoring device.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases that are used in this disclosure must be interpreted as referring to various objects and actions that are generally understood in various forms and equivalencies by persons of ordinary skill in the art. For example, the word "enclosure" as used herein is not limited to a toolbox and must be understood to be equally applicable to any of various other types of enclosures, containers, and/or enclosed spaces such as, for example, a toolbox, a storage cabinet in a building, a room of a building, a storage container in a warehouse, a cargo area of an aircraft, a package transported in an aircraft, a pod, or a shipping container. The enclosures can be either in a moving environment (in a vehicle, for example) or can be stationary (in a building, for example). The word "tool" as used herein encompasses any of various types of objects that include a wireless communication system for tracking and/or locating the tool such as, for example, a radio-frequency (RF) locator tag, a radio-frequency identification (RFID) element, or an RF chip. The word "software" as used herein encompasses any of various forms of computer code and may be provided in various forms such as in the form of a software package, a firmware package, retail software, or Original Equipment Manufacturer (OEM) software. The word "cooperate," as used herein with reference to two or more devices, refers to transfer of information between the devices. The word "information," as used herein with reference to a device, refers to any of various forms of data produced by the device such as, for example, digital data, sensor signal data, and temperature data. It must be understood that words such as "implementation," "configuration," "application," "scenario," "case," and "situation" as used herein represent abbreviated versions of the phrase "In an example ("implementation," "configuration," "application," "scenario,"

"situation," "case," "approach," and "situation") in accordance with the disclosure." It must also be understood that the word "example" as used herein is intended to be non-exclusionary and non-limiting in nature.

FIG. 1 illustrates an example tool monitoring system 100 in accordance with an embodiment of the disclosure. The example tool monitoring system 100 is described with respect to a tool 141 that is stored in an enclosure in the form of a toolbox 140. However, it must be understood that the description is equally valid to any object that is placed in any of various other types of enclosures and/or enclosed spaces. Accordingly, in another scenario, the tool 141 may be stored on a rack, a seat, or a glove compartment of the vehicle 115. When stored in the rack or seat, it must be understood that the cabin of the vehicle is the enclosure. When stored in the glove compartment, it must be understood that the glove compartment is the enclosure.

In the illustrated example scenario, the toolbox 140 is located in a vehicle 115, which can be any of various types of vehicles such as, for example, a gasoline powered vehicle, an electric vehicle, a hybrid electric vehicle, a car, a sports utility vehicle (SUV), a truck, a van, a semi-trailer truck, a bus, a driver-operated vehicle, or an autonomous vehicle. The description herein is applicable to the vehicle 115 irrespective of the state of the vehicle 115 (moving, stopped, stationary, disabled, etc.).

The vehicle 115 can include various components such as, for example, a vehicle computer 110, a tool monitoring device 105, an infotainment system 125, a detection system 130, a global positioning satellite (GPS) system 165, and a communication system 135. The vehicle computer 110 may perform various functions such as, for example, controlling engine operations (fuel injection, speed control, emissions control, braking, etc.), managing climate controls (air conditioning, heating etc.), detecting airbag activations, detecting component failures, detecting engine malfunctions, and issuing alerts (check engine light, bulb failure, low tire pressure, vehicle in blind spot, etc.). In some cases, the vehicle computer 110 may include more than one computer such as, for example, a first computer that controls engine operations and a second computer that operates the infotainment system 125.

The tool monitoring device 105 can include a processor 111 and a memory 112 in which is stored computer-executable instructions that are executed by the processor 111 to enable the tool monitoring device 105 to perform various operations in accordance with the disclosure. In an example implementation, the tool monitoring device 105 can be either an integral part of the vehicle computer 110 or can be located in a unit that is communicatively coupled to the vehicle computer 110.

The detection system 130 can include various types of sensors and detectors such as, for example, a temperature sensor, a door opening detector, a window opening detector, a wireless signal strength detector, a LiDAR scanner, ultrasonic sensor, a video camera, and/or a digital camera. Some or all of the sensors and detectors may be used by the tool monitoring device 105 in accordance with the disclosure.

The infotainment system 125 can be an integrated unit that includes various components such as a radio, a CD player, and a video player. In an example implementation, the infotainment system 125 has a display that includes a graphical user interface (GUI). The GUI of the infotainment system 125 may be used by a driver 120 of the vehicle 115 to provide to the tool monitoring device 105, information such as, for example, details of the tool 141, details of the toolbox 140, and/or details about a location of the toolbox 140. The driver 120, who is shown walking toward the vehicle 115 in the example illustration, may use a personal communications device 121 (in lieu of, or in addition to the GUI of the infotainment system 125) to communicate with the tool monitoring device 105. The personal communications device 121 can be any of various devices such as, for example, a smartphone, a key fob, a laptop computer, a tablet computer, or a smart wearable device.

The GPS system 165 may be communicatively coupled to the infotainment system 125 (for providing navigation information to the driver 120) and may also be communicatively coupled to the tool monitoring device 105 (to provide location information of the vehicle 115, which in some cases can be passed on to a tool tracking device 160 to enable the tool tracking device 160 to identify a location of the toolbox 140 and the tool 141).

The communication system 135 can include wired and/or wireless communication devices mounted in or on the vehicle 115 in a manner that support various types of communications inside the vehicle 115 such as, for example, communications between the tool 141, the tool monitoring device 105, and the vehicle computer 110. The communication system 135 may utilize one or more of various wired and/or wireless technologies for this purpose, such as, for example, Bluetooth®, Ultra-Wideband (UWB), Wi-Fi, Zigbee®, Li-Fi (light-based communication), audible communication, ultrasonic communication, and/or near-field-communications (NFC).

The communication system 135 may also be used by the tool 141, the tool monitoring device 105, and the vehicle computer 110 to communicate with devices that are located outside the vehicle 115, such as, for example, the tool tracking device 160. The tool tracking device 160 can include a processor 161 and a memory 162 in which is stored computer-executable instructions that are executed by the processor 161 to enable the tool tracking device 160 to perform various operations in accordance with the disclosure.

In an example scenario, the tool tracking device 160 is a server computer. In another example scenario, the tool tracking device 160 is a cloud computer. In yet another example scenario, the tool tracking device 160 is a computer that is dedicated for purposes of tracking one or more tools such as, for example, the tool 141, in accordance with the disclosure. Communications between the tool monitoring device 105 in the vehicle 115 and the tool tracking device 160 may be carried out via a network 155. Communications between the tool 141 and the tool tracking device 160 may also be carried out via the network 155. The network 155 may include any one network, or a combination of networks, such as, for example, a local area network (LAN), a wide area network (WAN), a telephone network, a cellular network, a cable network, a wireless network, and/or private/public networks such as the Internet.

The network 155 may support one or more types of communication technologies such as, for example, Transmission Control Protocol/Internet Protocol (TCP/IP), Cellular, Bluetooth®, Ultra-Wideband (UWB), near-field communication (NFC), Wi-Fi, Wi-Fi direct, Li-Fi, vehicle-to-vehicle (V2V) communications, vehicle-to-infrastructure (V2I) communications, and vehicle-to-everything (V2X) communications.

In the illustrated example scenario, the tool 141 is configured to communicate with the tool monitoring device 105 via a communication link 152 using a first communication protocol (for example, Bluetooth®, UWB, and/or NFC) and to communicate with the tool tracking device 160 via a communication link 151 using a second communication protocol (for example, TCP, cellular, Wi-Fi, and/or Wi-Fi direct).

In another example scenario, the tool 141 can communicate with the tool monitoring device 105 using a first communication protocol (cellular, for example) and with the tool tracking device 160 using a second communication protocol that is the same as the first communication protocol.

In the illustrated example scenario, the tool 141 can be any type of tool (drill, wrench, hammer, router, saw, meter, etc.) that may be used by any type of person who may use the vehicle 115 (owner, handyman, plumber, carpenter, builder, mechanic, etc.). The tool 141 includes a wireless communication system 142 that can be either built into the tool 141 or attached to the tool 141 (an RF tag or RF chip, for example). The tool 141 can, for example, be any in a family of tools referred to by DeWalt® company as "Tool Connect™ Tools and Batteries" (impact drivers, battery packs, etc.).

In an example implementation, the toolbox 140 may further include a temperature sensor 143 that is configured to measure a temperature inside the toolbox 140 and convey a temperature reading to the tool monitoring device 105. Another temperature sensor (not shown) that may be located in the cabin of the vehicle 115 can be configured to measure a temperature in the cabin of the vehicle 115 and convey a temperature reading to the tool monitoring device 105.

Figure 2B:
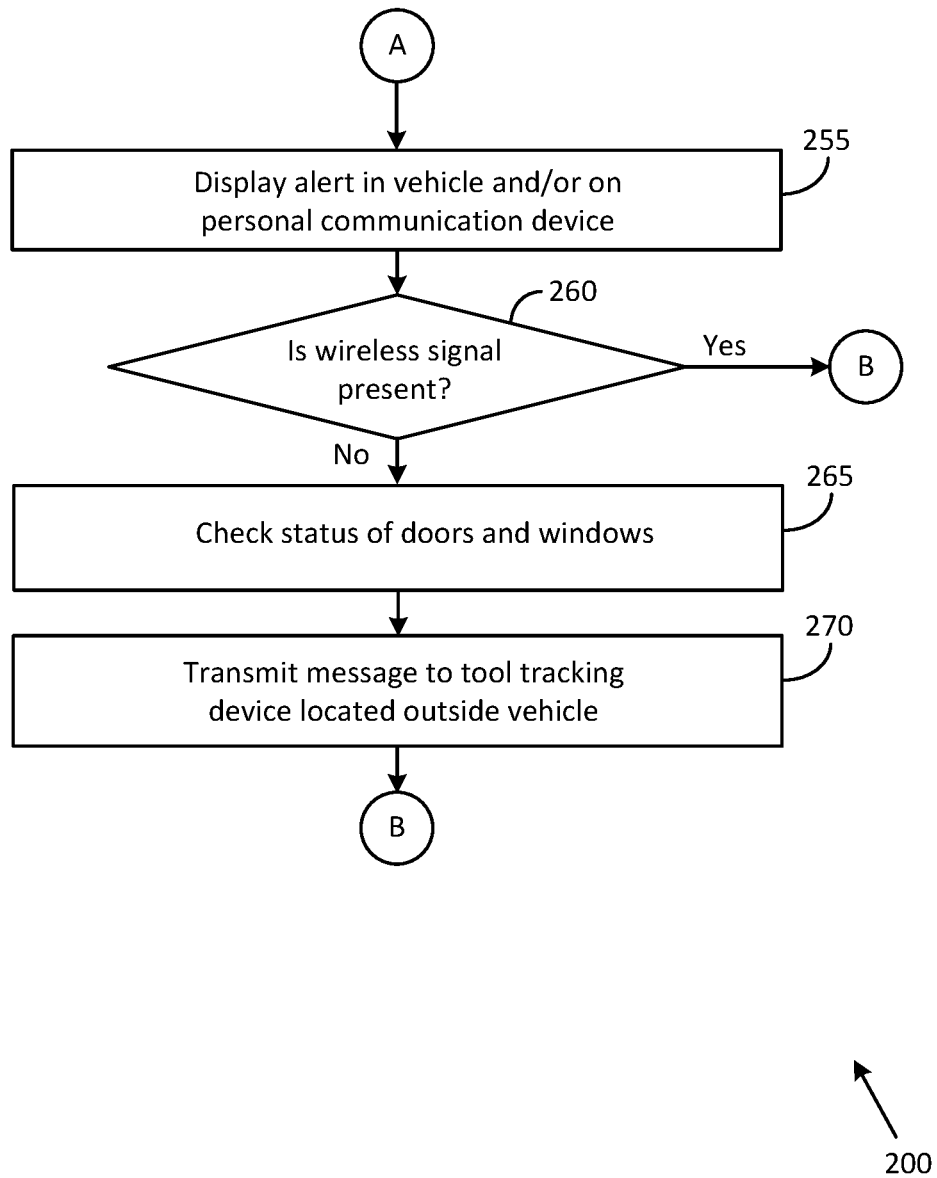

FIGS. 2A and 2B illustrate a flowchart 200 of a method to provide tool monitoring in accordance with an embodiment of the disclosure. The flowchart 200 illustrates a sequence of operations that can be implemented in hardware, software, or a combination thereof. In the context of software, the operations represent computer-executable instructions stored on one or more non-transitory computer-readable media such as the memory 112 of the tool monitoring device 105 and the memory 162 of the tool tracking device 160, that, when executed by one or more processors such as the processor 111 of the tool monitoring device 105 and the processor 161 of the tool tracking device 160, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Furthermore, some of the operations are described with respect to a tool stored in a toolbox that is located in a vehicle, but it must be understood that the operations can be carried out in various other environments under various other conditions (for example, various types of tools stored in various types of enclosures, containers, and/or enclosed spaces such as, for example, a storage cabinet in a building, a room of a building, a storage container in a warehouse, a cargo area of an aircraft, a package transported in an aircraft, a shipping container, etc.).

At block 205, monitoring of an operational status of a wireless communication system that is a part of a tool is started. The wireless communication system can be either an integral part of the tool or can be attached to the tool and used for tracking the tool. In an example scenario, the wireless communication system is provided in the form of an RF tag or RF chip that is attached to the tool or integrated in the tool at sale by the tool manufacturer. The wireless communication system can be configured to communicate with various devices for various purposes. In an example implementation, the wireless communication system may be configured to communicate with a tool monitoring device for enabling the tool monitoring device to monitor an operational status of the wireless communication system. The wireless communication system may be further configured to communicate with a tool tracking device for enabling the tool tracking device to track the tool. Tracking the tool may be carried out for various reasons such as, for example, for inventory purposes and/or to prevent theft of the tool. More particularly, and in accordance with the disclosure, the tool tracking device tracks the tool based on wireless communications between the tool tracking device and the wireless communication system in the tool.

In an example implementation, the tool tracking device transmits a query to the wireless communication system (either on a periodic basis or on an as-needed basis) and identifies a status of the tool (location, health, etc.) based on receiving a response to the query from the wireless communication system. In another example implementation, the wireless communication system transmits a signal to the tool tracking device (either on a periodic basis or on an infrequent basis) to inform the tool tracking device of a status of the tool (location, health, etc.).

In an example scenario, the wireless communication system in the tool may fail to respond to a query or fail to transmit a signal to the tool tracking device due to various reasons. In one case, the wireless communication system may fail to respond to a query or fail to transmit a signal to the tool tracking device because the wireless communication system has been intentionally disabled. The wireless communication system may have been intentionally disabled as a part of a malicious activity such as, for example, theft of the tool or misuse of the tool. In this case, if the tool is believed to be outside the storage container (i.e., the cabin or tool box) and a storage container door or window has not opened since the last location ping by the tool, then the tool tracking device may accurately conclude, based on a failure to receive a signal from the wireless communication system, that the tool has been stolen or is being misused (for example, removed from an authorized location for improper use).

In another case, the wireless communication system in the tool may have failed due to any of various reasons and be unable to communicate with the tool tracking device even though the tool has not been stolen or misused. In this case, the tool tracking device may improperly conclude, based on a failure to receive a signal from the wireless communication system, the tool has been stolen or is being misused. One example reason for the wireless communication system in the tool to fail is a malfunction or a failure of an electronic component such as, for example, a semiconductor component or a failure of a battery unit. The malfunction or failure can be caused by many factors. In an example scenario, where the tool is placed in a toolbox and the toolbox is placed in a vehicle (in a cabin of the vehicle, for example), the wireless communication system can fail as a result of a temperature inside the toolbox and/or in the cabin of the vehicle being outside an operating temperature range of the wireless communication system.

Semiconductor components that are intended for commercial use are typically rated for operations over a temperature range of 0° C. to 70° C., those that are intended for industrial use are typically rated for operations over a temperature range of −40° C. to 85° C., and those that are intended for military grade use are typically rated for operations over a temperature range of −55° C. to 125° C. In an example scenario, the temperature inside the toolbox stored in a vehicle may reach 140° C. on a summer day in a tropical location or may drop well below 0° C. on a winter day in a location that is subjected to arctic conditions, thereby falling outside an operating temperature range of one or more semiconductor components of the wireless communication system. Further, the battery used in most consumer electronics has a smaller operating temperature range than most semiconductor components. Regardless, if the battery is a rechargeable battery or a coin cell, for example, the useful temperature range for such batteries can typically be 0° C. to 60° C. As such, a battery can start to deteriorate outside this temperature range and provide an unstable voltage to the semiconductor components. As a result, the semiconductor components may begin to operate in an unpredictable manner and in some cases, may fail to deliver the intended function of wireless communication.

A failure of the wireless communication system in the tool as a result of the temperature inside the toolbox and/or in the cabin of the vehicle being outside the operating temperature range of the wireless communication system may, in some cases, cause a tool tracking device to misconstrue the failure as indicative of the tool having been stolen or being misused. Consequently, and in accordance with the disclosure, the tool monitoring device, which may be provided in the vehicle in which the toolbox is located, is configured to detect the failure of the wireless communication system in the tool and to inform the tool tracking device of a status of the tool (still present in the vehicle, removed from the vehicle, etc.). The tool monitoring device may further assist the tool tracking device by providing information about a location of the tool (still present in the vehicle, removed from vehicle, status indeterminate). In an example scenario, the tool tracking device is located outside the vehicle and is communicatively coupled to the tool monitoring device and the wireless communication system in the tool.

At block 210, the tool monitoring device receives from a temperature sensor, temperature data pertaining to the enclosure in which the tool is located. In an example scenario, the tool monitoring device receives a temperature value based on a temperature measurement of a toolbox in which the tool is located in a vehicle.

At block 215, a determination is made by the tool monitoring device whether the temperature inside the enclosure exceeds a first threshold temperature. The first threshold temperature may be selected on the basis of various factors. In an example implementation, the first threshold temperature is selected on the basis of a first likelihood of failure or malfunctioning of the wireless communication system when exposed to the first threshold temperature. For example, the first margin may be set to correspond to a percentage (plus or minus) of maximal values of the operating temperature range. Thus, with respect to an example operating temperature range of −10° C. to 40° C., the first threshold temperature may be set to correspond to ±5% of −10° C. or ±10% of 40° C., for example. The wireless communication system may or may not fail when exposed to the first threshold temperature. For example, in some cases, the wireless communication system may operate in a suboptimal mode when exposed to the first threshold temperature (such as, for example, transmit a wireless signal that has a lower-than-normal amplitude).

At block 220, the tool monitoring device issues an advisory to execute a preemptive remedial action to prevent a failure of the wireless communication system. In an example implementation, the advisory may be issued in the form of a notification that may be displayed on a display screen of a device such as, for example, an infotainment system in a vehicle or a personal communication device carried by a driver of the vehicle. The tool monitoring device may also recommend a preemptive remedial action in the form of activating a climate control system in the vehicle, moving the vehicle to a new parking location, or moving the tool to a different location. Activating the climate control system can involve turning up the temperature in the cabin of the vehicle (when the first threshold temperature is a cold temperature) and reducing the temperature in the cabin of the vehicle (when the first threshold temperature is a hot temperature). The preemptive remedial action may be carried out by an occupant of the vehicle (a driver, for example) or by a vehicle computer of the vehicle (when the vehicle computer has a capability to autonomously operate the climate control system of the vehicle).

At block 225, the tool monitoring device waits for a period of time that may be selected to allow the climate control system to modify an ambient temperature of the cabin of the vehicle and modify a temperature of the toolbox containing the tool. In an example implementation, the tool monitoring device may set the period of time based on obtaining from a temperature sensor, a measurement of an ambient temperature outside the vehicle, and determining a temperature differential between the ambient temperature outside the vehicle and the ambient temperature of the cabin of the vehicle. In an example scenario, the tool monitoring device may wait for a first period of time that is based on a first temperature differential between the ambient temperature outside the vehicle and the ambient temperature of the cabin of the vehicle. In another example scenario, the tool monitoring device may wait for a second period of time that is based on a second temperature differential between the ambient temperature outside the vehicle and the ambient temperature of the cabin of the vehicle. The second period of time may be greater than the first period of time when the second temperature differential is greater than the first temperature differential.

At block 230, the tool monitoring device may receive from the temperature sensor in an enclosure in which the tool is located, temperature information pertaining to the enclosure such as, for example, a temperature inside the toolbox in which the tool is located in the vehicle.

At block 235, a determination is again made by the tool monitoring device whether the temperature inside the enclosure exceeds the first threshold temperature (described above with reference to block 215). If the temperature inside the enclosure does not exceed the first threshold temperature, the actions indicated by block 210 and subsequent blocks are carried out.

If the temperature inside the enclosure exceeds the first threshold temperature, at block 240, a determination is made by the tool monitoring device whether the temperature inside the enclosure exceeds a second threshold temperature. The second threshold temperature may be selected on the basis of various factors. In an example implementation, the second threshold temperature is selected in correspondence to a second margin that may be set with respect to maximal values of the operating temperature range of the wireless communication system in the tool. The second margin, which can be set to correspond to a percentage that exceeds extreme values of the operating temperature range. For example, with respect to an operating temperature range of −10° C. to 60° C., the second threshold temperature may be set to correspond to ±20% of −10° C. (colder than maximal cold temperature) or ±25% of 60° C. (hotter than maximal hot temperature). The second margin may be selected on the basis of a second likelihood of failure or malfunctioning of the wireless communication system when exposed to the second threshold temperature. The second likelihood of failure is greater than the first likelihood of failure. For example, the wireless communication system may completely fail to operate when exposed to the second threshold temperature.

In another example implementation, the second threshold temperature may be set on the basis of an expected weather condition, a current weather condition, or a weather forecast that is applicable to the vehicle at the time that the flowchart 200 is executed.

If the temperature inside the enclosure does not exceed the second threshold temperature, the actions indicated by block 220 and subsequent blocks are carried out.

If the temperature inside the enclosure exceeds the second threshold temperature, at block 245, a determination is made whether a wireless signal transmitted by the wireless communication system is present. The determination may be made in any of various ways. In an example implementation, the tool monitoring device may receive a signal from a wireless signal strength detector such as, for example, a received signal strength indicator (RSSI) detector, that provides an indication to the tool monitoring device whether the wireless signal is present and an amplitude of the wireless signal when present. In an example embodiment, the wireless signal strength detector may be configured to detect one of either a first wireless signal that is used by the wireless communication system in the tool to communicate with the tool monitoring device or a second wireless signal that is used by the wireless communication system in the tool to communicate with a tool tracking device. The first wireless signal may have a first wireless communication format (Bluetooth®, for example) and the second wireless signal may have a second wireless communication format (cellular, for example). In another example embodiment, the wireless signal strength detector may be configured to detect the first wireless signal as well as the second wireless signal so as to allow the tool monitoring device to distinguish between a failure of a first type of circuit and a second type of circuit in the wireless communication system in the tool. The first type of circuit may be associated with generating the first wireless signal and the second type of circuit may be associated with generating the second wireless signal.

In another example implementation, the determination whether a wireless signal transmitted by the wireless communication system in the tool is present, may be made by use of a tool polling procedure to monitor an operational status of the wireless communication system. The tool polling procedure can involve the tool monitoring device transmitting a query (periodically or on an as-needed basis) to the wireless communication system in the tool and monitoring a response to the query from the wireless communication system. A failure to respond to a query may indicate a failure of the wireless communication system.

In another example implementation, the determination whether a wireless signal transmitted by the wireless communication system in the tool is present, may be made by use of a heartbeat procedure. The heartbeat procedure can involve the wireless communication system automatically transmitting a heartbeat signal to the tool monitoring device based on a periodic schedule (every 5 minutes, every hour, etc.). A failure to receive the heartbeat signal by the tool monitoring device may indicate a failure of the wireless communication system. In one case, the heartbeat signal can be a pulse signal. In another case, the heartbeat signal can be a pulse pattern (preset sequence of pulses). In yet another case, the heartbeat signal can be a message.

If at block 245, the determination indicates that the wireless signal transmitted by the wireless communication system in the tool is present, at block 250, the tool monitoring device may execute an action to verify a security status of the tool such as, for example, to detect a vulnerability to theft of the tool. In an example scenario where the tool is located in a toolbox that is placed in a cabin of a vehicle, the tool monitoring device may detect a status of all doors and windows of the vehicle. The status of the doors and windows may be determined by use of door sensors and/or window sensors (magnetic sensors, for example) and/or by evaluating images provided to the tool monitoring device by one or more cameras located in the cabin of the vehicle. In an example scenario, all the doors and windows of the vehicle may be in an unopened state at a first instant in time when the action indicated at block 250 is carried out. In another example scenario, one or more doors and/or one or more windows of the vehicle may be in a partially open or fully open at the first instant in time when the action indicated at block 250 is carried out.

Determination of an unopened or partially opened status of a window can include operations such as evaluating information stored in a memory of the tool monitoring device to determine a status of the window. The stored information may indicate, for example, whether a command was last issued by the tool monitoring device and/or by the vehicle computer to place the window in one of a closed state, an open state, or a partially-opened state. Determination of the unopened or partially opened status of a window can additionally include evaluating information provided by one or more cameras, LiDAR systems, and/or ultrasonic sensors to assess if the window is intact (e.g., an electronically closed window may still be open due to someone smashing the glass).

If at block 245, the determination indicates that the wireless signal transmitted by the wireless communication system in the tool is not present, at block 255, the tool monitoring device may issue an alert. In an example implementation, the alert may be displayed on a display screen of an infotainment system of a vehicle in which the tool is located and/or on a personal communication device of a driver of the vehicle. The alert may recommend remedial action that may be taken to ensure that the tool is secure. In an example case, the remedial action may involve the driver of the vehicle verifying that the tool is still located in the vehicle and may further involve the driver taking action to address the failure of the wireless communication device in the tool.

At block 260, a determination is made whether the wireless signal is present. In a first scenario, the driver of the vehicle may have executed remedial action and the wireless signal is present once again. In this first scenario, the action indicated in block 210 and subsequent blocks are executed. In a second scenario, the wireless signal is not present. In this second scenario, at block 265, the tool monitoring device may execute an action to verify a status of the tool such as, for example, to detect a theft of the tool. In an example scenario where the tool is located in a toolbox that is placed in a cabin of a vehicle, the tool monitoring device may detect a status of all doors and windows of the vehicle. The status of the doors and windows may be determined by use of door sensors and/or window sensors (ultrasonic devices, magnetic sensors, etc.) and/or by evaluating images provided to the tool monitoring device by one or more cameras located in the cabin of the vehicle. In an example scenario, all the doors and windows of the vehicle may be in an unopened state at a second instant in time when the action indicated at block 265 is carried out. In another example scenario, one or more doors and/or one or more windows of the vehicle may be in a partially open or fully open state at the second instant in time when the action indicated at block 265 is carried out.

The tool monitoring device may determine a status of the tool based on evaluating the condition of the doors and/or windows over a period of time such as, for example over a period of time that extends from the first instant in time when the action indicated in block 250 is carried out to the second instant in time when the action indicated in block 265 is carried out.

If all windows and/or doors of the vehicle are in a fully closed state at the first instant in time and one or more windows and doors of the vehicle are in a partially open or fully open state at the second instant in time, the tool monitoring device may make a determination that there is a likelihood of the tool having been removed from the vehicle.

If all windows and/or doors of the vehicle are in a fully closed state at the first instant in time and at the second instant in time, the tool monitoring device may make a determination that the tool has not been removed from the vehicle.

In an example scenario, the determination that the tool has not been removed from the vehicle may be confirmed by evaluating a status of one or more other tools that may be present in the enclosure in which the tool is located. The status of the other tools may be evaluated for example, by determining whether wireless signals are being received by the tool monitoring device from these other tools. The presence of wireless signals from the other tools may provide to the tool monitoring device a higher degree of confidence that the tool is present in the vehicle and that the wireless communication system of the tool has failed.

In another example scenario, the determination that the tool has not been removed from the vehicle may be confirmed based on evaluating historical data of the tool. In one case, the historical data, which can be stored in a tool event history database, may indicate that the wireless communication system of the tool is prone to failure irrespective of the ambient temperature around the tool. Such failures may provide to the tool monitoring device a higher degree of confidence that the tool is present in the vehicle and that the wireless communication system of the tool has failed.

If one or more windows and/or doors of the vehicle is in a partially open or fully open state at the first instant in time and also at the second instant in time, the tool monitoring device may make a determination that the status of the tool is indeterminate.

The tool monitoring device may be unable to evaluate the status of the tool if the action indicated at block 250 has not been performed. In this case, the tool monitoring device may make a determination that the status of the tool is indeterminate.

At block 270, the tool monitoring device communicates with the tool tracking device to convey information about the tool to the tool tracking device. In an example scenario, the tool monitoring device may inform the tool tracking device that the wireless communication system in the tool is malfunctioning or has failed. The tool monitoring device may also provide an indication to the tool tracking device of a security status of the tool such as, for example, a likelihood that the tool is present in the vehicle even though the wireless communication system has failed, a likelihood that the tool has been removed from the vehicle, and/or that the status of the tool is indeterminate.

After completion of the action indicated at block 270, the actions indicated at block 210 and subsequent blocks may be carried out.

Figure 3:
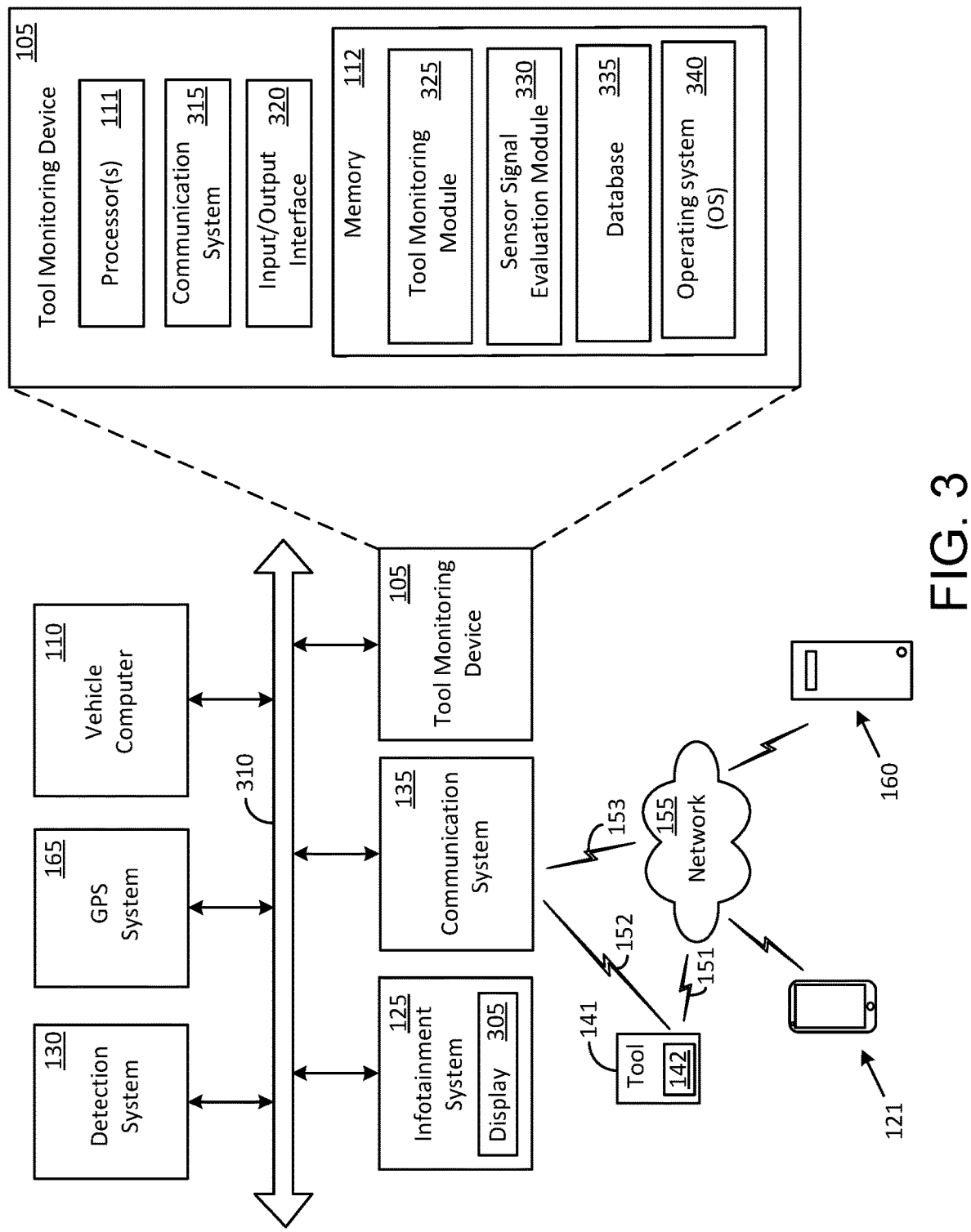
FIG. 3 shows some example components that may be provided in a vehicle that is configured to provide tool monitoring in accordance with an embodiment of the disclosure.

FIG. 3 shows some example components that may be provided in a vehicle that is configured to provide tool monitoring in accordance with an embodiment of the disclosure such as, for example, the vehicle 115 shown in FIG. 1. The example components may include the detection system 130, the GPS system 165, the vehicle computer 110, the infotainment system 125, the communication system 135, and the tool monitoring device 105.

The various components are communicatively coupled to each other via one or more buses such as, for example, a bus 310. The bus 310 may be implemented using various wired and/or wireless technologies. For example, the bus 310 can be a vehicle bus that uses a controller area network (CAN) bus protocol, a Media Oriented Systems Transport (MOST) bus protocol, and/or a CAN flexible data (CAN-FD) bus protocol. Some or all portions of the bus 310 may also be implemented using wireless technologies such as Bluetooth®, Bluetooth® Low Energy, Ultra-Wideband, Wi-Fi, Zigbee®, or near-field-communications (NFC). For example, the bus 310 may include a Bluetooth® communication link that allows the tool monitoring device 105 and the detection system 130 to wirelessly communicate with each other and/or the tool monitoring device 105 to communicate with the vehicle computer 110.

The communication system 135 can include wired and/or wireless communication devices mounted in or on the vehicle 115 in a manner that support various types of communications such as, for example, communications between the tool monitoring device 105 and the vehicle computer 110. The communication system 135 may also allow the tool monitoring device 105 to communicate with devices located outside the vehicle 115, such as, for example, the wireless communication system 142 in the tool 141 (directly via the communication link 152 and/or via the communications link 153, the network 155, and the communications link 151), the personal communications device 121 (via the communications link 153 and the network 155), and the tool tracking device 160 (via the communication link 153 and the network 155).

In an example implementation, the communication system 135 can include a single wireless communication unit that is coupled to a set of wireless communication nodes. In some cases, the wireless communication nodes can include a Bluetooth® low energy module (BLEM) and/or a Bluetooth® low energy antenna module (BLEAM). In other cases, the wireless communication nodes can include a Bluetooth® low energy module, an Ultra-Wideband, NFC (BUN) module and a UWB Anchor Module.

The infotainment system 125 can include a display 305 having a GUI for carrying out various operations. The GUI may be used to allow the driver 120 to provide to the tool monitoring device 105, information such as, for example, details of the tool 141, details of the toolbox 140, and/or details about a location of the toolbox 140. The GUI may be used by the tool monitoring device 105 to display information to the driver 120 such as, for example, the advisory described above with respect to block 220 of the flowchart 200 and the alert described above with respect to block 255 of the flowchart 200.

The driver 120 may use the personal communications device 121 (in lieu of, or in addition to, the GUI of the infotainment system 125) to communicate with the tool monitoring device 105. The personal communications device 121 can be any of various devices such as, for example, a smartphone, a key fob, a laptop computer, a tablet computer, or a smart wearable device. In an example implementation, a software application may be downloaded into the personal communications device 121 from an app store, or the vehicle dealership for example. The software application is configured to allow the personal communications device 121 to interact with the tool monitoring device and execute various operations in accordance with the disclosure. In an example implementation, the software application displays information to the driver 120 such as, for example, the advisory described above with respect to block 220 of the flowchart 200 and the alert described above with respect to block 255 of the flowchart 200. Example alerts and advisories displayed on a display screen of the personal communications device 121 can include: "Tool may be offline due to extreme cabin temperature. It is recommended that the climate control system be activated to address the situation," "It is assumed your tool remains secure as the vehicle has not detected any door or window opening," and "The status of your tool is indeterminate."

The detection system 130 can include one or more of various types of devices such as, for example, a temperature sensor, a door opening detector, a window opening detector, a wireless signal strength detector, a LiDAR scanner, ultrasonic sensor, a video camera, and/or a digital camera.

The GPS system 165 can include a GPS device that communicates with a GPS satellite or a terrestrial GPS system (e.g., cell towers) for obtaining location information, including, for example, a location of the vehicle 115. The location information of the vehicle 115 may be utilized by various entities, such as, for example, the tool monitoring device 105 to convey location information of the vehicle 115 to the tool tracking device 160 in some scenarios.

The tool monitoring device 105 may include a processor 111, a communication system 315, an input/output interface 320, and a memory 112. The communication system 315 can include various types of transceivers that allow the tool monitoring device 105 to communicate with the vehicle computer 110 and other devices located inside or outside the vehicle 115.

The input/output interface 320 can be used to allow various types of signals and information to pass into, or out of, the tool monitoring device 105. For example, the input/output interface 320 may be used by the tool monitoring device 105 to receive temperature information from a temperature sensor, a door status (open, closed) from a door opening detector, and images from a camera. The input/output interface 320 may also be used to receive and/or transmit signals to the vehicle computer 110. For example, the input/output interface 320 may be used to instruct the vehicle computer 110 to modify a temperature of the cabin of the vehicle 115.

The memory 112, which is one example of a non-transitory computer-readable medium, may be used to store an operating system (OS) 340, a database 335, and various code modules such as a tool monitoring module 325, and a sensor signal evaluation module 330. The code modules are provided in the form of computer-executable instructions that are executed by the processor 111 to enable the tool monitoring device 105 to perform various operations in accordance with the disclosure. The tool monitoring module 325 can be executed for example, by the processor 111, to perform various operations such as described in flowchart 200.

The sensor signal evaluation module 330 may be used by the tool monitoring module 325 to evaluate various types of sensor signals such as, for example, a temperature signal received from a temperature sensor.

The database 415 may be used to store various types of data such as, for example, tool information, toolbox information, and temperature related information.

It must be understood that in various embodiments, actions performed by the processor 111 of the tool monitoring device 105 can be supplemented, complemented, replicated, or replaced by actions performed by other processors in other devices, such as, for example, the processor 161 in the tool tracking device 160, a processor in the vehicle computer 110, and a processor in the personal communications device 121.

Figure 4:
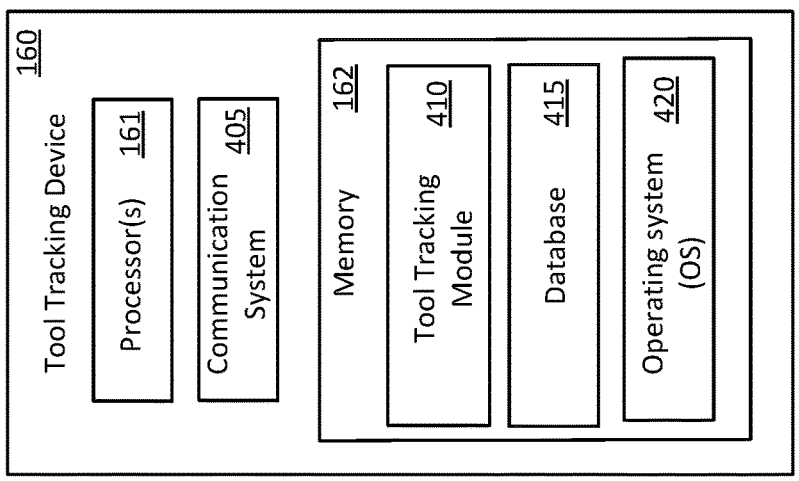
FIG. 4 shows some example components that may be included in a tool tracking device in accordance with an embodiment of the disclosure.

FIG. 4 shows some example components that may be included in the tool tracking device 160 in accordance with an embodiment of the disclosure. The tool tracking device 160 may include the processor 161, a communication system 405, and the memory 162. The communication system 405 can include one or more wireless transceivers that allow the tool monitoring device 105 to communicate with the tool monitoring device 105 and the wireless communication system 142 in the tool 141, for example.

The memory 162, which is another example of a non-transitory computer-readable medium, may be used to store an operating system (OS) 420, a database 415, and various code modules such as a tool tracking module 410. The code modules are provided in the form of computer-executable instructions that are executed by the processor 161 to enable the tool tracking device 160 to perform various operations in accordance with the disclosure. The tool tracking module 410 can be executed by the processor 161, to perform various operations such as, for example, receiving communications from the tool monitoring device 105 and performing tracking operations upon the tool 141.

The database 415 may be used to store various types of data such as, for example, information about various tools, tracking status of various tools, current status of various tools, and a tools inventory. In an example scenario, the tool tracking device 160 executes an event recording procedure that includes storing in the database 415, a tool event history, a notification of a failure of the wireless communications system, and an indication that a tool has not been removed from the cabin of a vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 111, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 112, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a tool monitoring device, a failure of a wireless communication system included in or on a tool that is stored in an enclosure in a vehicle;
   determining, at a first time, a first temperature in the enclosure;
   determining, at the first time, that a door or window of the vehicle is closed;
   determining, by the tool monitoring device, that the failure is attributable to the first temperature in the enclosure being outside of an operating temperature range of the wireless communication system;
   displaying on a display screen of the tool monitoring device and/or transmitting to a tool tracking device, a notification of the failure an indication of an action to reduce the first temperature in the enclosure;
   determining, after a period of time has elapsed subsequent to the first time, a lack of a response from the wireless communication system;
   determining, at a second time, that the door or the window are at least partially open; and
   causing to provide, based on the lack of response from the wireless communication system and based on the door or window being closed at the first time and at least partially open at the second time, an alert.

2. The method of claim 1, wherein the enclosure is a toolbox placed in a vehicle, wherein the tool monitoring device is configured to monitor an operational status of the wireless communication system, and wherein the tool tracking device is configured to track the tool.

3. The method of claim 2, wherein detecting the failure of the wireless communication system in the tool comprises detecting a loss of a wireless signal transmitted by the wireless communication system.

4. The method of claim 2, wherein detecting the failure of the wireless communication system in the tool comprises detecting the lack of a response from the wireless communication system to a tool polling procedure executed by the tool monitoring device.

5. The method of claim 2, wherein the tool monitoring device is located inside the vehicle, wherein the tool tracking device is located outside the vehicle, and wherein the wireless communication system is configured to operate by use of a first wireless communication format to communicate with the tool monitoring device and a second wireless communication format to communicate with the tool tracking device.

6. The method of claim 1, wherein the enclosure is located within a vehicle, and wherein the period of time is based on a differential between an ambient temperature outside of the vehicle and an ambient temperature inside the vehicle.

7. The method of claim 1, wherein the enclosure is located in a vehicle, and wherein the action includes at least one of: automatically adjusting a climate control system of the vehicle or moving the vehicle to a different location.

* * * * *